(12) United States Patent
Touchet

(10) Patent No.: US 8,714,402 B2
(45) Date of Patent: May 6, 2014

(54) THERMOFORMED CONTAINER ASSEMBLY FOR FOOD PRODUCTS

(75) Inventor: Joseph M. Touchet, Robbinsdale, MN (US)

(73) Assignee: General Mills, Inc., Minneapolis, MN (US)

( * ) Notice: Subject to any disclaimer, the term of this patent is extended or adjusted under 35 U.S.C. 154(b) by 487 days.

(21) Appl. No.: 12/691,423

(22) Filed: Jan. 21, 2010

(65) Prior Publication Data

US 2011/0174423 A1 Jul. 21, 2011

(51) Int. Cl.
*B65D 6/02* (2006.01)
*B65D 6/38* (2006.01)
*B65D 90/02* (2006.01)

(52) U.S. Cl.
USPC .......................... 220/613; 220/625; 220/669

(58) Field of Classification Search
USPC ................. 220/625, 613, 621, 620, 719, 675; 206/519, 512, 520, 509
See application file for complete search history.

(56) References Cited

U.S. PATENT DOCUMENTS

| | | | |
|---|---|---|---|
| 1,811,896 A * | 6/1931 | Ross | .................................. 4/619 |
| 2,088,181 A * | 7/1937 | Swift, Jr. | ........................ 229/4.5 |
| 2,276,678 A | 3/1942 | Wheeler | |
| 3,039,646 A | 6/1962 | Merz | |
| 3,204,799 A | 9/1965 | Hunter et al. | |
| 3,273,746 A | 9/1966 | Andrews, Jr. | |
| 3,403,804 A | 10/1968 | Colombo | |
| 3,441,173 A | 4/1969 | Edwards | |
| 3,478,913 A | 11/1969 | Kemp | |
| 3,495,733 A | 2/1970 | Davis | |
| 3,499,538 A | 3/1970 | Sherard | |
| 3,499,567 A | 3/1970 | Spotts | |
| 3,666,088 A | 5/1972 | Wingardh | |
| 3,739,939 A | 6/1973 | Koenig | |
| 3,788,509 A | 1/1974 | Keeler | |
| 4,049,122 A | 9/1977 | Maxwell | |
| 4,096,947 A | 6/1978 | Morse | |
| D248,916 S | 8/1978 | Reynolds et al. | |
| 4,157,147 A | 6/1979 | DeForest et al. | |
| D252,796 S | 9/1979 | Fortuna et al. | |
| D254,293 S | 2/1980 | Fortuna et al. | |
| 4,193,494 A | 3/1980 | Green | |

(Continued)

FOREIGN PATENT DOCUMENTS

DE 1904088 A1 9/1969
DE 2640479 A 9/1976

(Continued)

*Primary Examiner* — Anthony Stashick
*Assistant Examiner* — Kevin Castillo
(74) *Attorney, Agent, or Firm* — Timothy A. Czaja; Annette M. Frawley

(57) ABSTRACT

An assembly for forming a container that contains food product and including a thermoformed sleeve and a base. The sleeve includes a frustoconical side wall, an upper lip, and a lower lip. The side wall defines an inner surface, an outer surface, and a plurality of circumferentially-spaced handling features including an outer surface indentation and a corresponding inner surface protrusion. The upper lip projects generally radially inwardly from an upper end of the sleeve and the lower lip projects generally radially outwardly from the lower end. The base is formed apart from the sleeve, and is assembleable to the lower end for closing off the lower opening. In some embodiments, each of the plurality of handling features are wedge-shaped. In yet other embodiments, the base is a thermoformed part, and is ultrasonically welded to the lower lip.

19 Claims, 10 Drawing Sheets

(56) References Cited

U.S. PATENT DOCUMENTS

| | | |
|---|---|---|
| 4,282,699 A | 8/1981 | Embro, Jr. |
| 4,326,567 A | 4/1982 | Mistarz |
| 4,386,999 A | 6/1983 | Fortuna et al. |
| D270,813 S | 10/1983 | Fortuna et al. |
| D271,665 S | 12/1983 | Garwood et al. |
| 4,420,081 A | 12/1983 | Dart |
| D272,320 S | 1/1984 | Fortuna |
| D274,217 S | 6/1984 | Aramaki |
| 4,496,066 A | 1/1985 | Bullock, III |
| 4,515,242 A | 5/1985 | LaChance |
| 4,515,651 A | 5/1985 | MacLaughlin et al. |
| RE31,912 E | 6/1985 | Fortuna et al. |
| D281,303 S | 11/1985 | Fortuna |
| D281,399 S | 11/1985 | Fortuna |
| 4,556,445 A | 12/1985 | McCormick |
| 4,560,064 A | 12/1985 | Peterson et al. |
| 4,572,851 A | 2/1986 | Fortuna |
| 4,575,987 A | 3/1986 | Fortuna |
| D283,595 S | 4/1986 | Fortuna et al. |
| D283,596 S | 4/1986 | Fortuna et al. |
| 4,583,656 A | 4/1986 | MacLaughlin |
| 4,584,037 A | 4/1986 | Fortuna et al. |
| D283,677 S | 5/1986 | Fortuna et al. |
| D283,678 S | 5/1986 | Fortuna et al. |
| D283,791 S | 5/1986 | Fortuna et al. |
| D283,793 S | 5/1986 | Fortuna et al. |
| D284,350 S | 6/1986 | Fortuna et al. |
| D284,940 S | 8/1986 | Fortuna et al. |
| D285,530 S | 9/1986 | MacLaughlin |
| D285,531 S | 9/1986 | Peterson et al. |
| D285,532 S | 9/1986 | MacLaughlin |
| D285,536 S | 9/1986 | MacLaughlin |
| D285,653 S | 9/1986 | Fortuna et al. |
| D285,654 S | 9/1986 | MacLaughlin |
| D285,655 S | 9/1986 | MacLaughlin et al. |
| D285,774 S | 9/1986 | MacLaughlin |
| D285,775 S | 9/1986 | MacLaughlin |
| 4,610,351 A | 9/1986 | Coles et al. |
| 4,613,746 A | 9/1986 | MacLaughlin |
| 4,618,516 A | 10/1986 | Sager |
| 4,636,349 A | 1/1987 | MacLaughlin |
| D291,060 S | 7/1987 | MacLaughlin |
| D291,062 S | 7/1987 | MacLaughlin |
| D291,966 S | 9/1987 | MacLaughlin |
| 4,769,095 A | 9/1988 | Sager |
| 4,826,039 A | 5/1989 | Landis |
| 4,854,472 A | 8/1989 | Semersky |
| 4,872,586 A | 10/1989 | Landis |
| D317,120 S | 5/1991 | Schwartzburg |
| 5,024,340 A | 6/1991 | Alberghini et al. |
| 5,062,568 A | 11/1991 | Hill et al. |
| 5,152,438 A | 10/1992 | Gordon et al. |
| 5,155,971 A | 10/1992 | Zopf |
| 5,176,284 A | 1/1993 | Sorensen |
| 5,180,599 A | 1/1993 | Feldmeier et al. |
| D333,470 S | 2/1993 | Vong |
| 5,263,606 A | 11/1993 | Dutt et al. |
| 5,377,861 A | 1/1995 | Landis |
| D358,531 S | 5/1995 | Cousins et al. |
| D364,568 S | 11/1995 | Ishimoto |
| 5,484,072 A | 1/1996 | Beck et al. |
| 5,489,036 A | 2/1996 | Arkins |
| D369,971 S | 5/1996 | Brauner et al. |
| 5,725,120 A | 3/1998 | Ramsey et al. |
| 5,992,629 A | 11/1999 | Gullord et al. |
| D426,463 S | 6/2000 | Landis, II |
| 6,083,333 A | 7/2000 | Van Beers et al. |
| 6,085,489 A | 7/2000 | Bachner et al. |
| 6,213,301 B1 | 4/2001 | Landis et al. |
| 6,251,203 B1 | 6/2001 | Vala et al. |
| 6,325,213 B1 | 12/2001 | Landis, II |
| 6,547,093 B1 | 4/2003 | Messer et al. |
| 6,830,425 B2 | 12/2004 | Padovani |
| 2002/0148886 A1 * | 10/2002 | Miess ..................... 229/125.04 |

FOREIGN PATENT DOCUMENTS

| | | |
|---|---|---|
| EP | 0159051 A2 | 10/1985 |
| FR | 2082062 A | 3/1970 |
| GB | 1252434 | 11/1971 |
| GB | 1399094 | 6/1975 |
| GB | 2156265 A | 10/1985 |
| GB | 2156268 A | 10/1985 |
| GB | 2163124 A | 2/1986 |
| GB | 2252093 A | 7/1992 |
| JP | 5032248 A | 2/1993 |

* cited by examiner

THERMOFORMED CONTAINER ASSEMBLY FOR FOOD PRODUCTS

BACKGROUND

The present disclosure relates to plastic containers. More particularly, it relates to thermoformed containers for containing food products.

One area where the use of plastic containers has become wide spread is in the food packaging industry. Accordingly, it is common for these plastic food containers to serve as the end display package in which the food product is presented for sale to the customer. Typical of these containers are those used for dairy products such as cottage cheese, sour cream, or the like where an integral body of the container is provided having a side wall that tapers down from a larger diameter top opening to an integral, transverse bottom wall, with the top opening being closed by a separate, plug-fit lid. Normally, the lid has a depending peripheral skirt that locks onto an upper rim of the tapered wall of the container body.

A somewhat related plastic food container design currently used for flavored yogurt provides a reverse tapered side wall main body or sleeve forming a smaller diameter top opening and a large diameter bottom opening. A separate bottom closure member closes off the bottom opening so that yogurt (or other food product) can be received and contained within the main body. The bottom closure member includes a base panel and a depending skirt wall that is attached (e.g., spin-welded) to the interior surface of the main body to permanently attach the pieces to one another. Thus, unlike the previously described top closure lids that are designed to be opened (i.e., removed from the larger diameter opening of the container), the bottom closure for this particular yogurt container does not have a locking skirt that otherwise locks onto a rim of the side wall and that can be opened to gain access to the food therein. Instead, the bottom closure is affixed to the main body and after being filled with yogurt, the top opening is closed by a flexible foil seal adhered to a lip of the main body. To gain access to the yogurt, the seal is peeled away from the top opening.

Regardless of a final shape, in some instances, food product plastic containers have their parts formed by a thermoforming process. In thermoforming, a thin plastic sheet is formed into the desired shape by heating and forcing the sheet against a mold to produce a container part having a uniform, very thin cross-sectional thickness that can result in a part having very flexible walls. For example, the yogurt container described above was originally manufactured by thermoforming the main body and bottom closure, and then spinwelding the components to effectuate a permanent attachment. In an effort to address perceived concerns associated with these prior thermoformed and spinwelded yogurt containers, an injection molded construction was devised and is described, for example, in U.S. Pat. No. 6,213,301. In general terms, the '301 patent describes a two-piece, injection molded plastic container in which an injection molded frustoconical main body portion is ultrasonically welded to an injection molded lower body portion (serving as a bottom closure member). Ribs are formed on an exterior of the main body portion, and facilitate consistent, spaced stacking of multiple main body portions to one another, such as during shipping and/or within high speed automated feeding equipment. Similarly, internal ribs are formed along the lower portion, and facilitate desired spaced stacking thereof.

While the injection molded plastic containers of the '301 patent are highly viable, opportunities for improvement remain. For example, with injection molding, a relatively significant quantity of plastic resin is required in order to achieve desired container stiffness. Further, gate markings inherent to injection molded parts can hamper various production steps, such as when attempting to uniformly adhere the foil seal to the lip.

In light of the above, a need exists for an improved food product container.

SUMMARY

Some aspects in accordance with principles of the present disclosure relate to a container assembly for forming a container that contains food product. The assembly includes a thermoformed sleeve and a base. The sleeve has an upper opening and a lower opening, and includes a frustoconical side wall, and upper lip, and a lower lip. The side wall defines a diameter that increases from an upper end to a lower end. Further, the side wall defines an inner surface, an outer surface, a plurality of circumferentially-spaced indentations, and a plurality of protrusions. The indentations are formed in the outer surface adjacent the upper end. The protrusions are formed in the inner surface, with respective ones of the protrusions corresponding with respective ones of the indentations. The upper lip projects generally radially inwardly from the upper end to define the upper opening. The lower lip projects generally radially outwardly from the lower end. The base is formed apart from the sleeve, and is assembleable to the lower end for closing off the lower opening. In some embodiments, each of the plurality of indentations are wedge-shaped, with the outer surface tapering inwardly toward a central axis of the sleeve in extension from a leading side to a trailing side. In related embodiments, the inners surface defines an identical taper along each of the protrusions in forming a shoulder that serves as an abutment region for engaging the upper lip of an identical, second sleeve internally stacked therein. In yet other embodiments, the base is a thermoformed part, and is ultrasonically welded to the lower lip.

Yet other aspects in accordance with principles of the present disclosure relate to methods of manufacturing a container for containing food product. The method includes thermoforming the sleeve and thermoforming the base as described above. The base includes an annular wall and a flange. The annular wall is inserted within the lower opening of the sleeve, and the flange is placed into abutment with the lower lip. Ultrasonic energy is applied to the lower lip, causing welding of the lower lip and the flange to one another.

DETAILED DESCRIPTION

Figure 1:
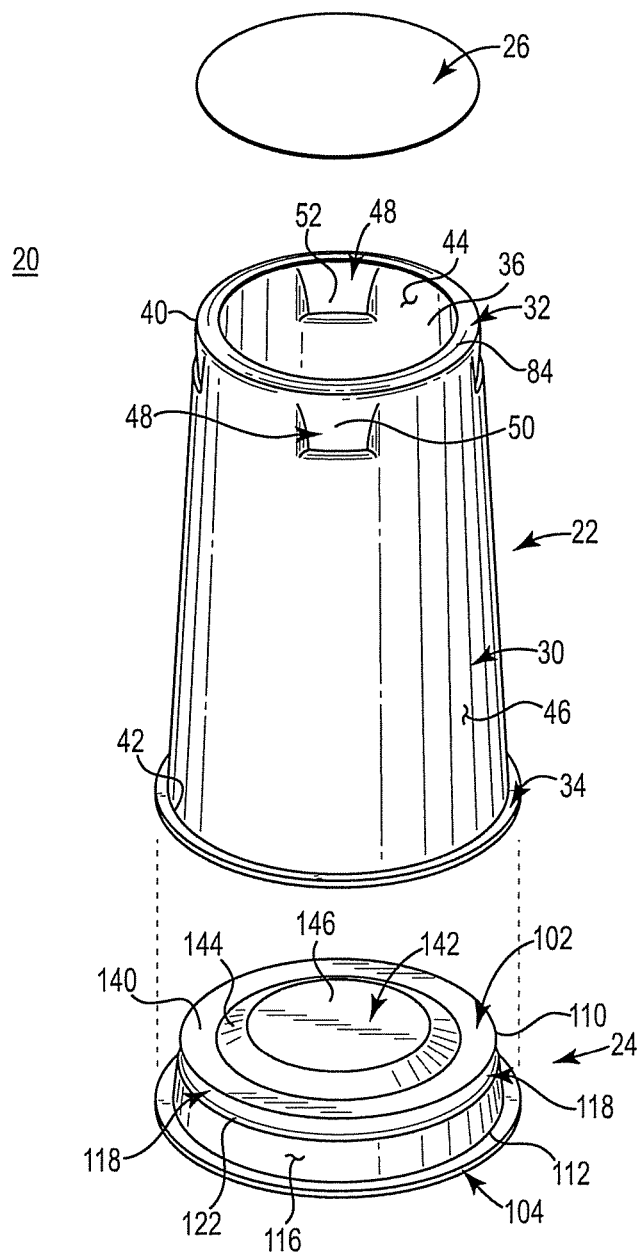
FIG. 1 is an exploded, perspective view of a container assembly in accordance with principles of the present disclosure.

One embodiment of a container assembly 20 for forming a food product container is shown in FIG. 1, and includes a sleeve 22 and a base 24. In general terms, the base 24 is configured to be attached at a bottom of the sleeve 22 so as to form an open top container for being filled with food products. In some constructions, the container is for yogurt and the exemplary dimensions set forth herein for the sleeve 22 and the base 24 are for a container that is filled with 6 oz. (170 g) of flavored yogurt; however, it will be understood that a size of the container assembly components 22, 24 and the corresponding dimensions can be varied from those described herein and still fall within the scope of the present disclosure. Similarly, other food product types or forms can be contained by the container. After being filled, the open top can then be closed by a thin seal (e.g., foil) member 26 that is removably adhered to the top of the sleeve 22 for sealing the food product in an interior of the container.

The sleeve 22 includes or defines a side wall 30, an upper lip 32, and a lower lip 34. The side wall 30 forms interior container region 36 and has a generally frustoconical shape, expanding in diameter from a smaller diameter upper end 40 to a larger diameter lower end 42. With additional reference to FIG. 2, the side wall 30 defines an inner surface 44 and an outer surface 46. With these conventions in mind, a plurality of handling features 48 are formed in the side wall 30 immediately adjacent the upper end 40 (e.g., the handling features 48 represent deviations from the otherwise uniform frustoconical shape initiating at a point that is in the range of 0.01-0.10 inch (0.254-2.54 mm) from the upper end 40 in some embodiments). The handling features 48 can be identical in terms of size, shape, and vertical distance from the upper end 40, and are circumferentially spaced from one another (e.g., equidistantly spaced). In some constructions, four of the handling features 48 are provided, although other numbers, such as a six, eight, etc., are also acceptable.

Figure 3:
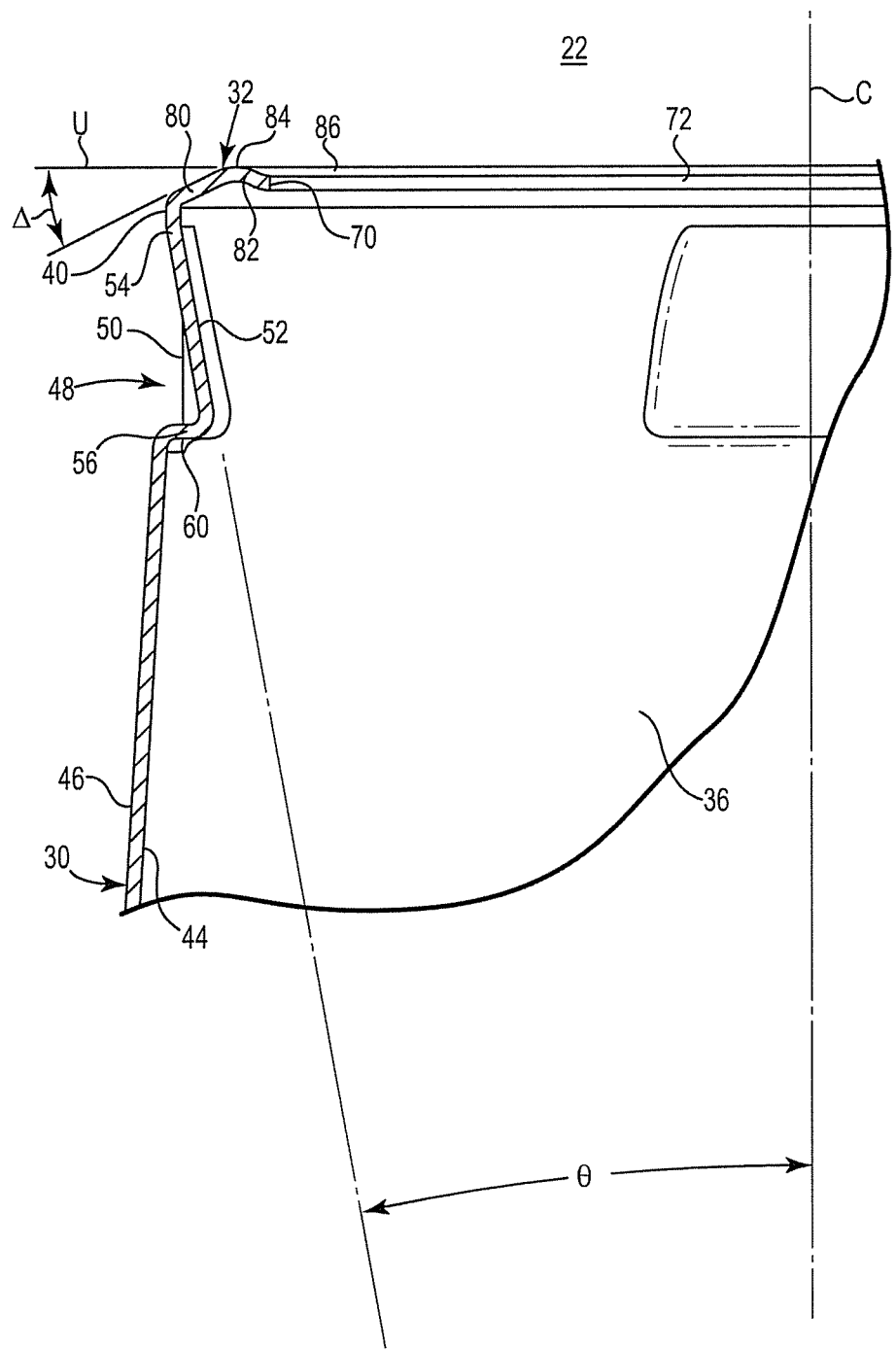
FIG. 3 is an enlarged, cross-sectional view of a portion of the sleeve of FIG. 2, illustrating a handling feature and upper lip portions thereof.

Each of the handling features 48 includes or defines an indentation 50 along the outer surface 46 and a protrusion 52 along the inner surface 44. In some embodiments, the side wall 30 has a uniform thickness (at least along a region of the handling features 48), such that dimensional attributes of the indentation 50 and the corresponding protrusion 52 can be identical or substantially identical. For example, one of the handling features 48 is shown in greater detail in FIG. 3. Relative to an upright orientation of the side wall 30, the handling feature 48 can be described as having a leading side 54 and a trailing side 56. The leading side 54 is defined immediately proximate the upper end 40 (and the upper lip 32), with the trailing side 56 being defined opposite the leading side 54. With these conventions in mind, the indentation 50 is characterized by the outer surface 46 tapering radially inwardly in extension from the leading side 54 to the trailing side 56 (i.e., deviating from the frustoconical top to bottom expansion (or reverse taper) of the side wall 30 found at regions other than the handling features 48). For example, relative to a vertical centerline C of the sleeve 22, the outer surface 46 defines a taper angle θ in the range of 1°-20°, optionally 10°, in extension from the leading side 54 to the trailing side 56. A longitudinal (or vertical) height of the handling features 48 (i.e., axial distance between the leading and trailing sides 54, 56) can be on the order of 0.20-0.42 inch (5.08-10.67 mm), optionally 0.313 inch (7.95 mm). With this construction, the indentation 50 provides a region for convenient insertion of a user's fingertip for removing the foil seal 26 (FIG. 1) otherwise applied to the upper lip 32 as described below.

Figure 2:
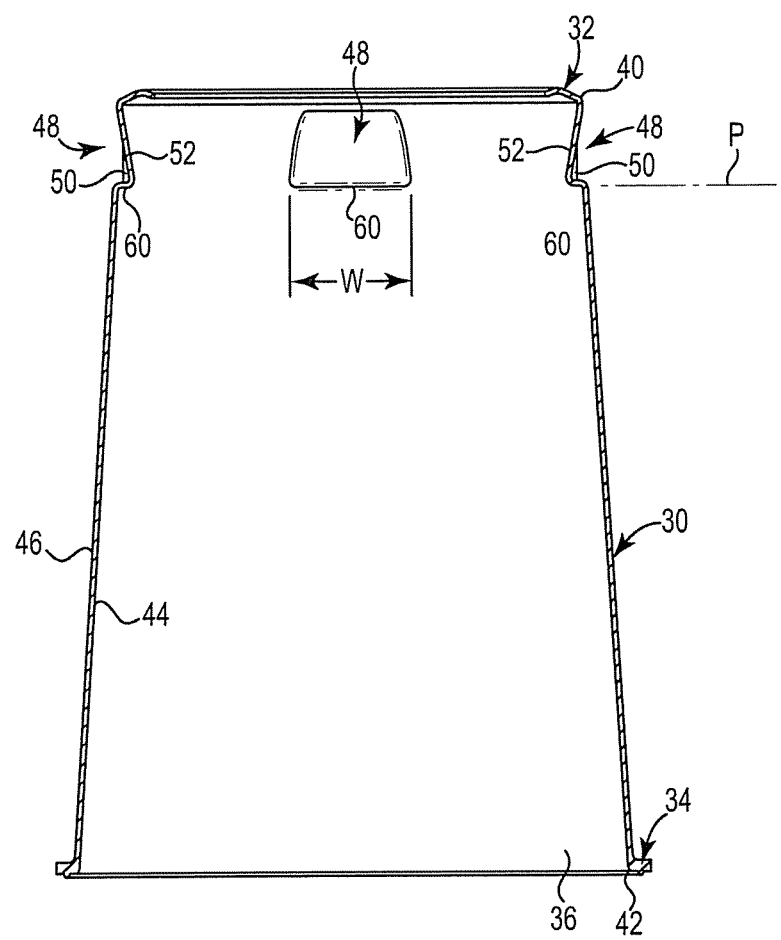
FIG. 2 is a cross-sectional view of a sleeve portion of the assembly of FIG. 1.

The protrusion 52 is characterized by the inner surface 44 tapering radially inwardly toward the vertical centerline C in extension from the leading side 54 to the trailing side 56 (i.e., deviating from the frustoconical top to bottom expansion of the side wall 30 found at regions other than the handling features 48). With embodiments in which the side wall 30 has a uniform thickness along at least the handling features 48, the inner surface 44 defines the identical taper angle θ in extension from the leading side 54 to the trailing side 56 along the protrusion 52. In other embodiments, a thickness of the side wall 50 can vary. Regardless, a shoulder 60 is defined by the inner surface 44 at the trailing side 56. The shoulder 60 is adapted to facilitate desired stacking. As best identified in FIG. 2, the shoulder 60 can have a circumferential width W in the range of 0.1-0.9 inch (2.54-22.86 mm), alternatively 0.4-0.6 inch (10.16-15.24 mm), optionally 0.5 inch (12.7 mm), and has relatively larger surface area as compared to a conventional, vertically oriented stacking rib. In particular, and as shown in FIG. 2, the shoulders 60 of each of the protrusions 52 are circumferentially aligned, and combine to establish a stacking plane P longitudinally spaced the upper end 40, and adapted to contact a separate sleeve nested within the sleeve 22. With embodiments in which the side wall 30 has a relatively uniform thickness along at least the handling features 48, the corresponding indentation 50 has a corresponding circumferential width (e.g., a nominal circumferential width at the trailing side 56 on the order of 0.4-0.6 inch (10.16-15.24 mm), optionally 0.5 inch (12.7 mm)). The circumferential width optionally tapers from the trailing side 56 to the leading side 54 in some embodiments.

Figure 4A:
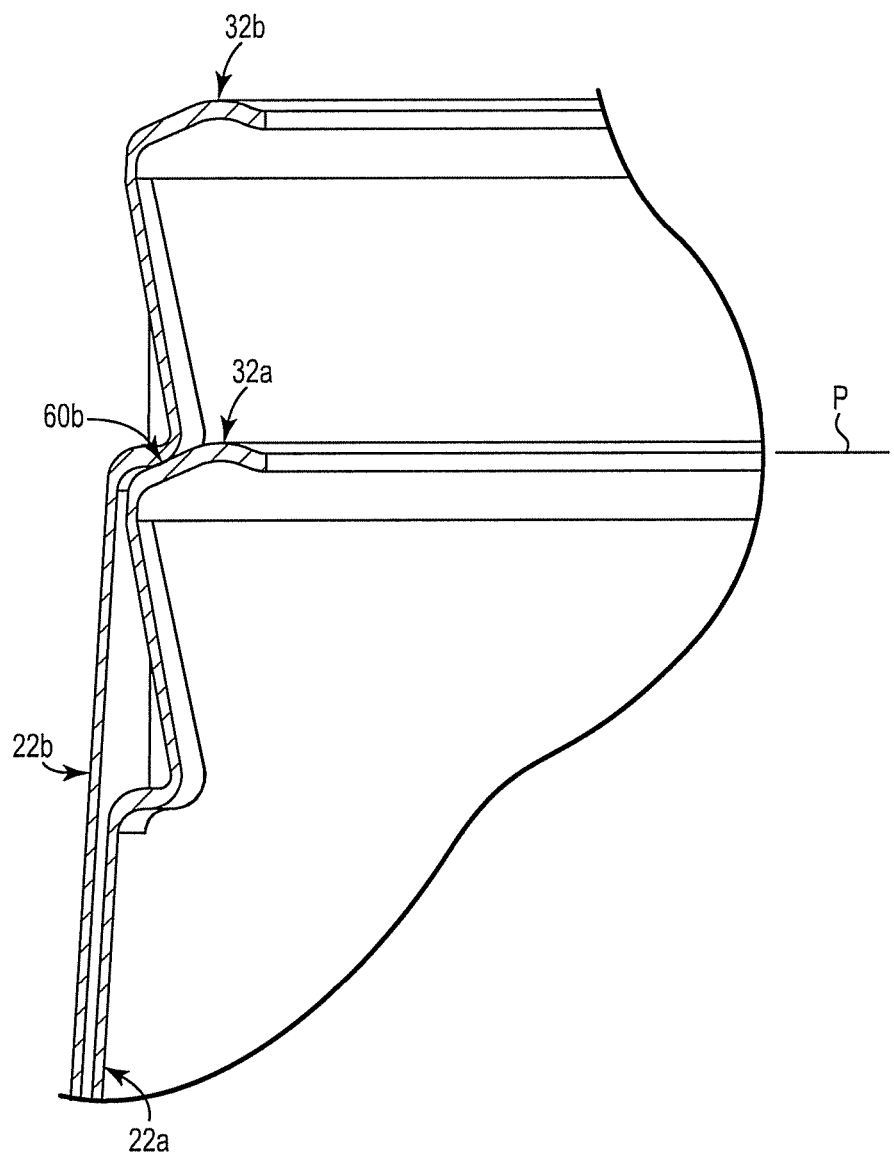
FIG. 4A is an enlarged, cross-sectional view showing a portion of two sleeves in accordance with principles of the present disclosure stacked one on top of the other in a compact, vertical arrangement.
Figure 4B:
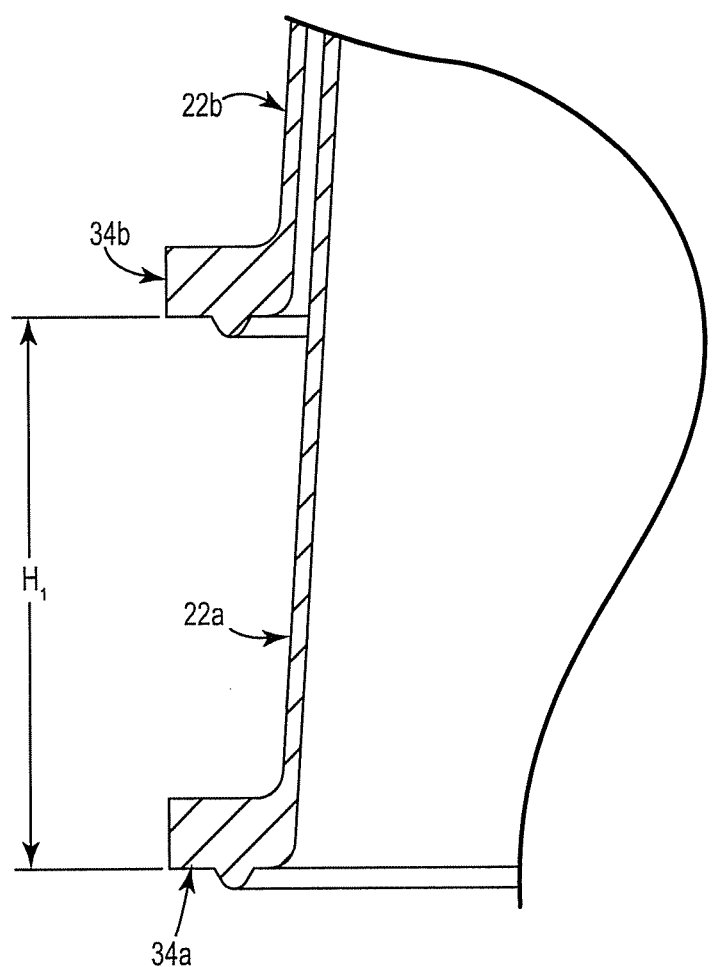
FIG. 4B is an enlarged, cross-sectional view of another portion of the stacked sleeve arrangement of FIG. 4A.
Figure 4C:
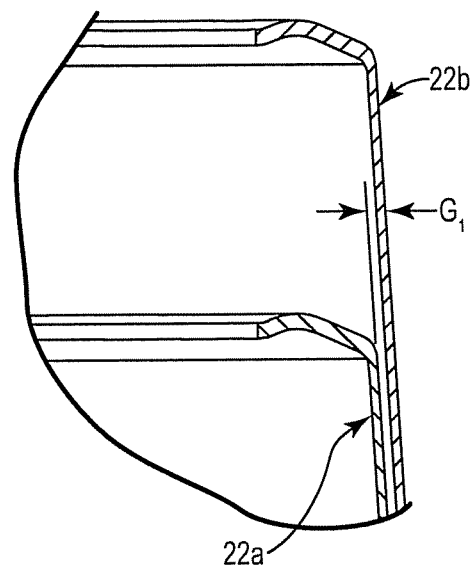
FIG. 4C is an enlarged, cross-sectional view of another portion of the stacked sleeve arrangement of FIG. 4A.

For example, FIG. 4A illustrates stacked assembly of a first (or interior) sleeve 22a within a second (or outer) sleeve 22b. As shown, the upper lip 32a of the first sleeve 22a contacts or abuts the shoulder 60b of the second sleeve 22b. A similar, abutting relationship is established between the upper lip 32a of the first sleeve 22a relative to the shoulders 60b formed by remaining ones of the handling features 48b associated with the second sleeve 22b along the stacking plane P. With this arrangement, then, the shoulders 60b ensure an adequate stacked spacing between the upper lips 32a, 32b (e.g., on the order of 0.3 inch (8.2 mm) in some embodiments). This spacing can also be referred to as a stacking height of the sleeves 22a, 22b. Conventionally, however, the stacking height is in reference to a longitudinal distance between exterior features. As shown in FIG. 4B, then, engagement between the upper lip 32a (FIG. 4A) of the first sleeve 22a and the shoulders 60b (FIG. 4A) of the second sleeve 22b defines a stacking height $H_1$ between the lower lips 34a, 34b that can be in the range of 0.2-0.6 inch (5.1-15.2 mm), alternatively 0.305-0.505 inch (7.751-12.83 mm), optionally 0.381 inch (9.677 mm). Also, FIG. 4C illustrates that a small air gap $G_1$ is maintained between the stacked sleeves 22a, 22b that can be on the order of approximately 0.004 inch (0.105 mm) in some embodiments. Thus, the sleeves 22a, 22b can be stacked in a compact, vertical arrangement providing for substantial savings in transportation costs in that a great number of the sleeves 22 can be stacked in a prescribed space.

Returning to FIG. 3, apart from the handling features 48, in some constructions the side wall 30 is linear or uniform in extension from the upper end 40 to the lower end 42 (FIG. 2), with the side wall 30 having a uniform thickness in the range of 0.005-0.020 inch (0.127-0.508 mm), optionally, 0.012 inch (0.305 mm). Alternatively, other features and/or thickness variations can be provided.

The upper lip 32 projects generally radially inwardly from the upper end 40 of the side wall 30, terminating at an annular edge 70 that otherwise defines an upper opening 72 to the interior region 36. In some constructions, at least a portion, optionally an entirety, of the upper lip 32 has a wall thickness that is greater than a thickness of the side wall 30; for example the upper lip 32 can have a thickness in the range of 0.016-0.026 inch (0.406-0.660 mm), optionally 0.021 inch (0.53 mm). Regardless, the upper lip 32 includes or defines a first segment 80 extending from the side wall 30, and a second segment 82 extending from the first segment 80 to the edge 70. An annular apex 84 is formed an intersection or transition of the segments 80, 82. The annular apex 84 defines an uppermost plane U of the sleeve 22, and serves as an attachment point or surface for the seal member 26 (FIG. 1). As illustrated, the annular apex 84 is radially offset or away from the edge 70 of the upper lip 32, and is highly smooth and continuous (e.g., raised gate markings are not formed) to provide a clean surface for bonding of the seal member 26.

The first segment 80 extends upwardly (relative to the upright orientation of FIG. 3) and radially inwardly from the upper end 40 of the side wall 30. For example, in some constructions, extension of the first segment 80 defines an angle Δ relative to the upper plane U in the range of 19°-29°, optionally 24°. The second segment 82 downwardly (relative to the upright orientation of FIG. 3) and radially inwardly from the first segment 80 to the terminal edge 70. For example, relative to an exterior surface 86 of the upper lip 32 (and the upright orientation of FIG. 3), the terminal edge 70 is below the annular apex 84 by a vertical distance in the range of 0.008-0.018 inch (0.203-0.457 mm), optionally 0.013 inch (0.33 mm). Alternatively, other dimensions also acceptable. In some embodiments, however, the terminal edge 70 is below the annular apex 84 such that the terminal edge 70 does not impede attachment of the seal member 26 (FIG. 1) to the apex 84 or otherwise overtly contact the seal member 26.

Figure 5:
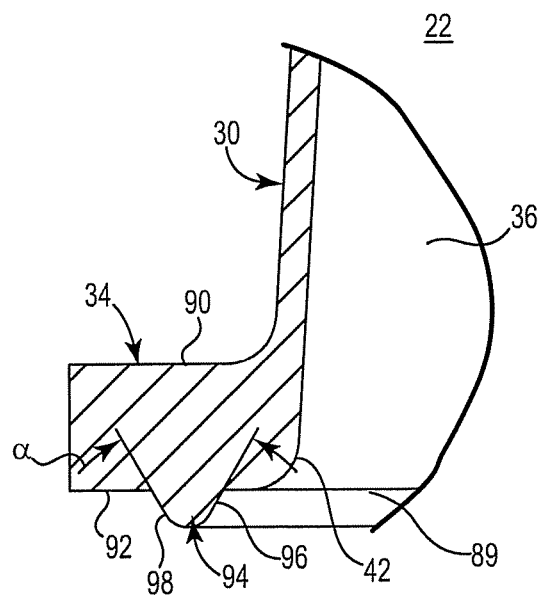
FIG. 5 is an enlarged, cross-sectional view of a portion of the sleeve of FIG. 2, illustrating a lower lip thereof.

The lower lip 34 extends radially outwardly from the lower end 42 as illustrated in FIG. 5. With this construction, a lower opening 89 to the interior region 36 is defined at the lower end 42. Alternatively, an additional, radially-inward structure can further be included. Regardless, the lower lip 34 defines an upper surface 90 and an opposing, lower surface 92. The upper surface 90 "faces" the upper end 40 (FIG. 2) of the side wall 30, whereas the lower surface 92 is defined opposite the upper surface 90 (i.e., relative to the upright orientation of FIG. 5, the upper surface 90 is above the lower surface 92). In some constructions, the lower lip 34 has a thickness (i.e., dimension between the upper and lower surfaces 90, 92) on the order of 0.046-0.056 inch (1.168-1.422 mm), optionally 0.051 inch (1.30 mm). Further, an annular ledge 94 is optionally provided as a downward projection from the lower surface 92. The annular ledge 94 has opposing sides 96, 98 (in transverse cross-section) that form an included angle α in extension from the lower surface 92. In some constructions, the included angle α is in the range of 50°-70°, optionally 60°.

Further, the annular ledge 94 can have a height on the order of 0.010-0.020 inch (0.254-0.508 mm), optionally 0.015 inch (0.38 mm) relative to the lower surface 92. Regardless, where provided, the annular ledge 94 can have a rounded top triangular cross-sectional shape, and serves as an energy director in connection with an ultrasonic welding operation between the sleeves 22 and the base 24 (FIG. 1) described below. Alternatively, the annular ledge/energy director 94 can be provided with the base 24 (FIG. 1), with the lower surface 92 optionally being textured in these alternative embodiments.

Figure 6:
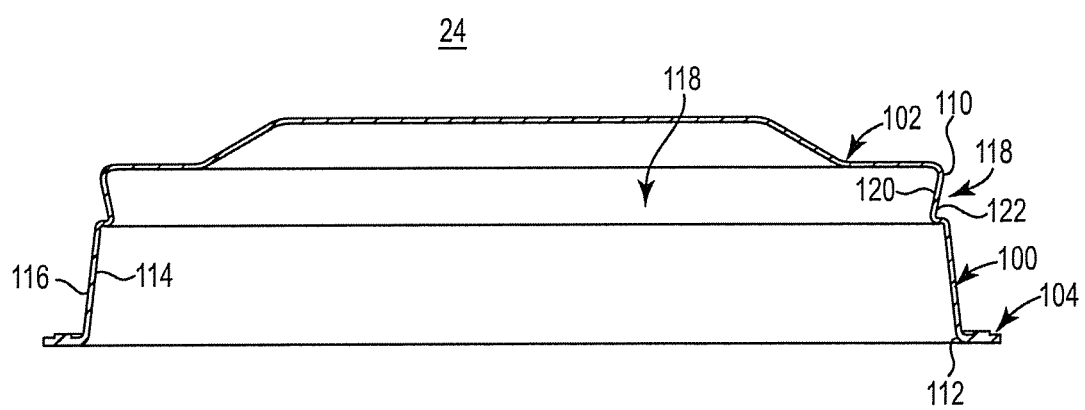
FIG. 6 is a cross-sectional view of a base portion of the assembly of FIG. 1.

Returning to FIG. 1, with additional reference to FIG. 6, the base 24 includes a skirt wall 100, a platform 102, and a flange 104. In general terms, the skirt wall 100 is sized for insertion within the lower opening 89 (FIG. 2) of the sleeve 22, with the platform 102 serving to close the lower opening 89. The flange 104 provides a surface for ultrasonic welding of the components 22, 24.

The skirt wall 100 has a frustoconical shape, expanding in diameter from a smaller diameter top end 110 to a larger diameter bottom end 112. Further, the skirt wall 100 defines an interior surface 114 and an exterior surface 116. With these designations in mind, the skirt wall 100 forms at least one handling feature 118 immediately adjacent the top end 110 (e.g., the handling feature(s) 118 represents deviation from the otherwise uniform frustoconical, reverse taper shape of the skirt wall 100). In the one construction of FIGS. 1 and 6, a single handling features 118 is formed; in other embodiments, however, the skirt wall 100 can define a plurality of the handling features 118 that are identical in terms of size, shape, and vertical distance from the top end 110, and are circumferentially spaced from one another (e.g., equidistantly spaced). With these alternative constructions, the skirt wall 100 can optionally include four, six, etc., of the handling features 118.

Figure 7:
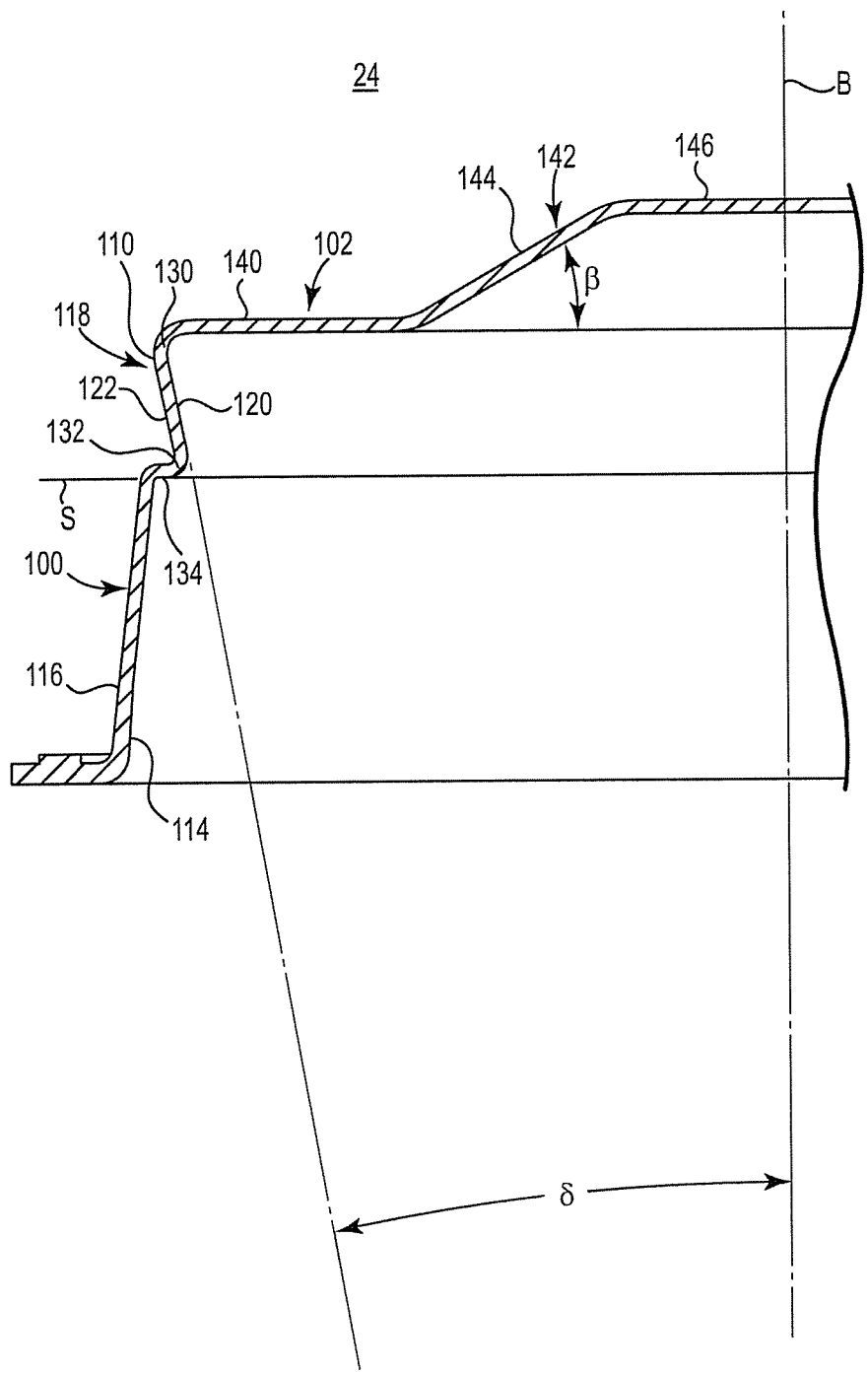
FIG. 7 is an enlarged, cross-sectional view of a portion of the base of FIG. 6.
Figure 8:
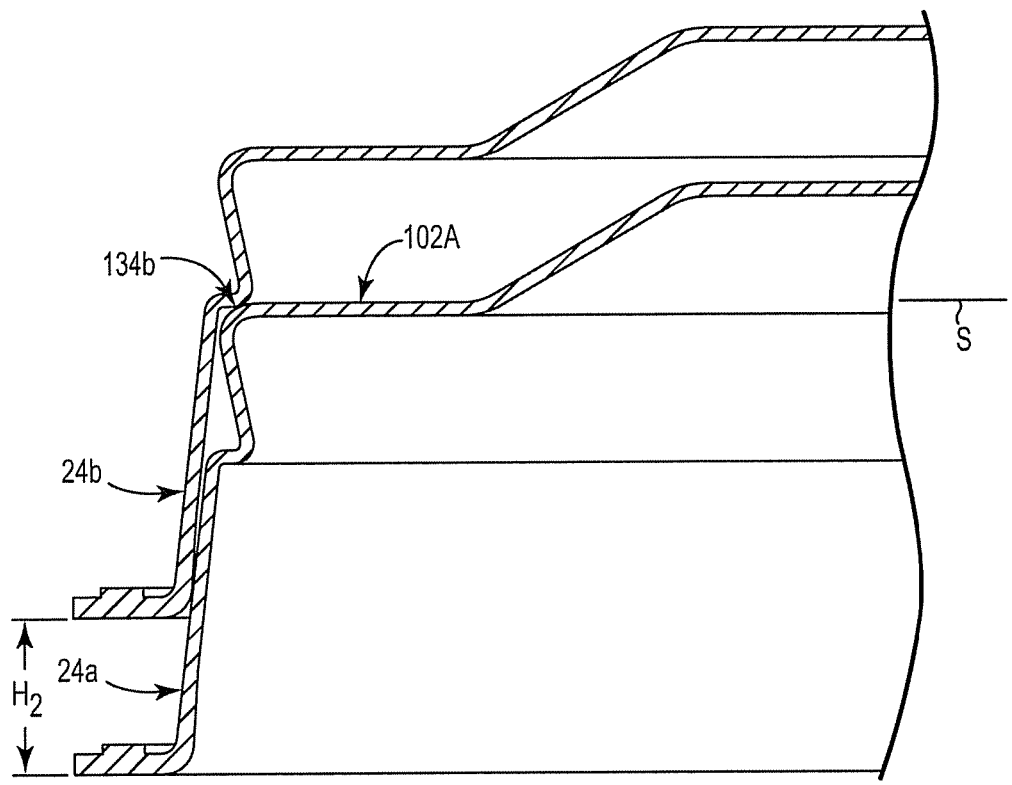
FIG. 8 is an enlarged, cross-sectional view of a portion of two bases in accordance with principles of the present disclosure stacked one on top of the other in a compact, vertical arrangement.

The handing feature 118 includes or defines a protuberance 120 along the interior surface 114. In some embodiments in which the skirt wall 100 has a uniform thickness along the regions of the handling feature 118 (e.g., on the order of 0.005-0.020 inch (0.127-0.508 mm), optionally 0.012 inch (0.0305 mm)), a corresponding depression 122 is formed along the exterior surface 116. Relative to an upright orientation of the base 24 in the cross-sectional view of FIG. 7, the handling feature 118 can be described as having a leading side 130 immediately proximate the platform 102 and an opposing trailing side 132, with the interior surface 114 projecting radially inwardly in extension from the leading side 130 to the trailing side 132 in forming the protuberance 120. In some embodiments, relative to a vertical centerline B of the skirt wall 100, the interior surface 114 forms a taper angle δ in the range of 7°-17°, optionally 12°, along the protuberance 120. The exterior surface 116 can have similar dimensional attributes in establishing the optional, corresponding depression 122. Regardless, a rim 134 is formed by the interior surface 114 at the trailing side 132, and defines a stacking plane S. As a point of reference, with alternative embodiments incorporating a plurality of circumferentially spaced handling features 118, each of the handling features 118 forms a rim segment, with the rim segments combining to define the stacking plane S. As shown in FIG. 8, then, when a first base 24a is nested within a second base 24b, the platform 102a of the first base 24a will abut the rim 134b of the second base 24b along the stacking plane S. In some constructions, the base 24 is dimensioned to provide a stack height $H_2$ in the range of 0.05-0.5 inch (1.27-12.7 mm), alternatively 0.066-0.266 inch (1.67-6.76 mm), optionally 0.166 inch (4.22 mm), although other stacking heights are also acceptable.

Returning to FIGS. 1 and 7, the platform 102 extends across the top end 110 of the skirt wall 100, and can include an outer ring segment 140 and a dome segment 142. The ring segment 140 can be relatively planar (horizontal relative to the orientations of FIGS. 1 and 7), having a radial width on the order of 0.26-0.29 inch (6.60-7.37 mm), optionally 0.2735 inch (6.950 mm). The dome segment 142 can include a rim portion 144 and a central portion 146. The rim portion 144 extends generally upwardly in radially inward extension from the ring segment 140, and can form an angle of extension β in the range of 20°-40°, optionally 30°. The central portion 146 extends across the rim portion 144, and in some constructions is planar (e.g., horizontal). Alternatively, the platform 102 can assume a variety of other shapes or formats.

Figure 9:
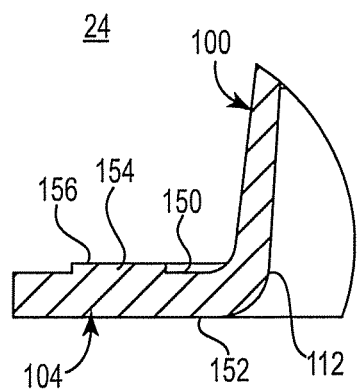
FIG. 9 is an enlarged, cross-sectional view of a portion of the base of FIG. 6, illustrating a lower flange thereof.

With specific reference to FIG. 9, the flange 104 extends radially outwardly from the bottom end 112 of the skirt wall 100, and defines a top surface 150 and a bottom surface 152. In some constructions, the bottom surface 152 is planar, and establishes a face for maintaining the base 24 in an upright orientation on a flat surface (e.g., table top). The top surface 150 can include or form a raised shelf 154 having a leading face 156. The leading face 156 is relatively planar, but is provided with surface texturing (e.g., embedded with a textured or roughened pattern a depth the order of 0.0045 inch (0.1143 mm) in some embodiments). Alternatively, the raised shelf 154 can be eliminated, and an entirety of the top surface 150 provided with the above-described texturing. Even further, the raised shelf 154 can be formed as an ultrasonic welding energy director. Regardless, and as described in greater detail below, the flange 104 provides a surface for effectuating ultrasonic welding with the sleeve 22 (FIG. 1), and in some embodiments has a thickness greater than a thickness of the skirt wall 100 (e.g., a thickness of the flange 104 between the surfaces 150, 152 can be approximately twice the nominal thickness of the skirt wall 100).

Returning to FIG. 1, in some embodiments, at least the sleeve 22, and in other embodiments both the sleeve 22 and the base 24, is a thermoformed component. For example, the sleeve 22 can be an integrally formed, homogenous body, thermoformed from a polypropylene-based plastic sheet. The base 24 can similarly be an integrally formed, homogenous body thermoformed from a polypropylene-based plastic sheet. A compression molding or down holder technique can be employed to generate the elevated thickness along certain portions of one or both of the components (e.g., the ledge/energy director 94 (FIG. 5)). As compared to prior injection-molded two-piece frustoconical container designs for containing 6 oz. (170 g) of yogurt, the thermoformed two-piece container constructions of the present disclosure require less material to achieve similar wall strength. This represents a significant cost savings. Further, because thermoforming techniques are employed, the resultant sleeve 22 and base 24 components are free of gate markings or other imperfections that might otherwise adversely affect performance.

Figure 10:
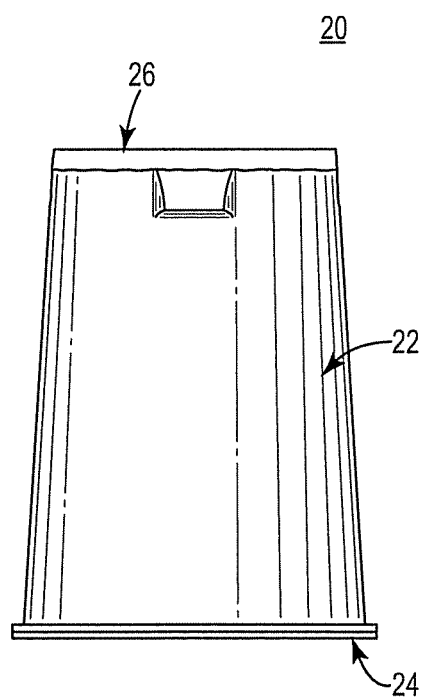
FIG. 10 is a side plan view of the container assembly of FIG. 1 upon final construction.

With reference to FIGS. 1 and 10, construction of the container assembly 20 includes locating the base 24 within the sleeve 22. In particular, the platform 102 and the skirt wall 100 of the base 24 are inserted within the lower opening 89 (FIG. 2) of the sleeve 22, with the lower lip 34 of the sleeve 22 abutting the flange 104 of the base 24. The components 22, 24 are then brought together in an ultrasonic fixture and ultrasonically welded to one another. For example, with embodiments in which the lower lip 34 includes the annular ledge/energy director 94, the ultrasonic horn is placed into contact with the lower lip 34 and ultrasonic energy applied. In response to the high frequency vibration, the annular ledge/energy director 94 (FIG. 5) melts and bonds to the shelf 154 (FIG. 9) of the flange 104 to effectuate a permanent weld, with the roughened face 156 (FIG. 9) increasing the abutting surface area so as to increase the frictional heat generated between the vibrating surfaces. Alternatively, the energy director can be provided with the flange 104. Following welding, the base 24 closes off the lower opening 89 of the sleeve 22. Food product (e.g., flavored yogurt) is then dispensed into the interior region 36, followed by application of the seal member 26 to the upper lip 32, and in particular via bonding to the annular apex 84.

The food product container assembly 20 of the present disclosure provides a marked improvement over previous designs. By employing thermoforming techniques in conjunction with desired materials (e.g., polypropylene-based materials), overall container strength is maintained, yet significant cost savings are realized. Further, the indentations formed by the sleeve provide convenient areas for placement of a user's fingers when attempting to remove the foil member. Finally, desired stacking arrangements of the sleeves and the bases relative to one another are achieved.

Although the present disclosure has been described with reference to preferred embodiments, workers will realize that changes can be made in form in form and detail without departing from the spirit and scope of the present disclosure.

What is claimed is:

1. An assembly for forming a container for containing food product, the assembly comprising:
    a thermoformed sleeve having an upper opening and a lower opening, the sleeve including:
        a frustoconical side wall having a diameter expanding from an upper end to a lower end, the side wall defining:
            an inner surface,
            an outer surface,
            a plurality of circumferentially-spaced handling features adjacent the upper end and each including an indentation along the outer surface and corresponding protrusion along the inner surface,
        an upper lip projecting from the upper end to define the upper opening, the upper lip including a first segment extending from the upper end and a second segment extending from the first segment to a terminal edge, wherein relative to an upward orientation of the sleeve, the first segment extends upwardly and radially inwardly from the side wall, and the second segment extends downwardly and radially inwardly from the first segment,
        a lower lip projecting from the lower end; and
    a base formed apart from the sleeve and assembleable to the lower lip for closing off the lower opening.

2. The assembly of claim 1, wherein each of the protrusions defines a shoulder opposite the upper end, the shoulders being circumferentially aligned to collectively define a stacking plane for engaging the upper lip of an identical, interiorly stacked sleeve.

3. The assembly of claim 1, wherein each of the indentations is wedge-shaped.

4. The assembly of claim 3, wherein the wedge shape includes a leading side proximate the upper end and a trailing side opposite the upper end, and further wherein the outer surface tapers inwardly toward a vertical centerline of the sleeve in extension from the leading side to the trailing side.

5. The assembly of claim 4, wherein each of the plurality of handling features includes the inner surface defining a taper angle identical to an angle of the taper defined by the outer surface along the corresponding indentation.

6. The assembly of claim 1, wherein the plurality of handling features includes only four of the indentations.

7. The assembly of claim 1, wherein a thickness of the upper lip is greater than a thickness of the side wall.

8. The assembly of claim 1, wherein an annular apex of the upper lip is defined at an intersection of the first and second segments, the annular apex defining an uppermost plane of the sleeve for receiving a flexible seal member installed over the upper opening.

9. The assembly of claim 8, wherein the annular apex is radially spaced from the terminal edge.

10. The assembly of claim 1, wherein a thickness of the lower lip is greater than a thickness of the side wall.

11. The assembly of claim 1, wherein the lower lip defines an upper surface facing the upper opening and a lower surface opposite the upper surface, and further wherein the lower lip forms a circumferential ledge along the lower surface.

12. The assembly of claim 11, wherein relative to an upright orientation of the sleeve, the circumferential ledge projects below the lower end of the side wall.

13. The assembly of claim 11, wherein upon final assembly, the ledge is welded to the base.

14. The assembly of claim 1, wherein the base is a thermoformed piece.

15. The assembly of claim 1, wherein the base includes:
a frustoconical skirt wall having a diameter increasing from a top end to a bottom end, the skirt wall defining an interior surface and an exterior surface;
a platform extending across the top end; and
a flange extending from the bottom end;
wherein the skirt wall is sized to nest within the lower opening of the sleeve with the lower lip abutting the flange.

16. The assembly of claim 15, wherein the skirt wall forms a protuberance along the interior surface proximate the top end.

17. The assembly of claim 16, wherein the skirt wall has a uniform thickness.

18. The assembly of claim 15, wherein a thickness of the flange is greater than a thickness of the skirt wall.

19. The assembly of claim 15, wherein relative to an upright orientation of the base, the flange defines a horizontal bottom surface and a top surface opposite the bottom surface, the flange further forming an annular shelf projecting longitudinally from the top surface, and further wherein a face of the shelf is rougher than the horizontal bottom surface.

* * * * *